Patented Oct. 31, 1944

2,361,627

UNITED STATES PATENT OFFICE 2,361,627

SLAG DEOXIDATION

Charles H. Herty, Jr., Hellertown, Pa., assignor to Bethlehem Steel Company, a corporation of Pennsylvania No Drawing. Application April 29, 1942, Serial No. 440,979

2 Claims. (Cl. 75—58)

This invention relates to improvements in the manufacture of steel, and particularly the manufacture of steel in the open hearth furnace.

In the manufacture of certain types of steel in the open hearth it is customary, when the heat of steel has reached approximately the desired carbon content, to "block" the heat in order to prevent or retard further carbon loss during the final stage of the melt. The most usual method of doing this has been by deoxidizing the steel bath by adding lumps of ferro-silicon, usually 14% ferro-silicon, to the bath. The lumps of ferro-silicon sank through the slag into the steel below and were there melted, with a deoxidizing effect on the steel. Some of the oxygen in the steel combined with the silicon, thus reducing the amount of oxygen available for union with the carbon and so preventing excessive carbon loss.

There are, however, certain disadvantages inherent in the use of lump 14% ferro-silicon for the purpose above set forth. In the first place it takes considerable time for the lumps to dissolve in the steel. Second, some of the silicon is retained in the steel in the form of undesirable silicates which are difficult to eliminate. Finally, although the ferro-silicon does have a deoxidizing effect on the steel, this is largely offset by the iron oxide entering the steel from the slag during the time required for dissolution and dissemination of the lump ferro-silicon.

I have discovered that a much improved practice and a cleaner steel results if, instead of deoxidizing the steel as above described, the slag itself is deoxidized to a desired degree with finely divided ferro-silicon. I carry out this process by throwing on the surface of the slag ferro-silicon, preferably 50% ferro-silicon, crushed to a desired size. The ferro-silicon should be of a size to ensure its weight being sufficient to penetrate into the slag, but small enough to ensure its reacting with the slag before reaching the surface of the steel bath. I have found that for this purpose a suitable degree of sub-division of the ferro-silicon is to a size approximating 8 mesh.

The amount of crushed ferro-silicon to be added to the slag can be determined more or less accurately on the basis of experience with a few heats. For example, with an average 125 ton heat of steel, 500 pounds of ferro-silicon, or 4 pounds to the ton, would be about correct with normal slag volume. For heats of a low carbon content, say under .10 of carbon, more ferro-silicon must be added to obtain the desired result. The slag, of course, should not be deoxidized to a degree which would result in the reversion of phosphorus into the steel from the slag. What is desired is to arrest or retard the reaction between slag and metal, to cut down on the transfer of iron oxide from the slag to the steel. It is possible to determine by observation when this condition has been reached, care always being taken to avoid using an excess of ferro-silicon.

In practicing this method of furnace deoxidation the heat is worked in the usual way until the carbon is at the desired concentration. Care should be taken that the slag is not too heavy at this time, else the crushed ferro-silicon will not penetrate the slag properly. The ferro-silicon is spread on the surface of the slag by shoveling it in each door of the furnace and within 3 minutes after it has been added the final additions of alloying elements or other deoxidizers are made. As soon as these additions are melted, the heat may be tapped. The time interval from the ferro-silicon addition to the tap is from 8 to 12 minutes instead of the usual 18 to 30 minutes with furnace deoxidation with 14% lump ferro-silicon.

By using the process just described, I find that most of the disadvantages inherent in the prior practice are to a large extent reduced. The finely divided ferro-silicon of course reacts with the slag very rapidly, thus reducing the time required for finishing the heat. Since the ferro-silicon does not enter the metal bath it does not cause inclusion of silicates, thus resulting in a cleaner steel.

As I have pointed out above, the addition of ferro-silicon to the slag must be controlled to avoid excessive deoxidation with accompanying phosphorus reversion. However, the permissible degree of deoxidation of the slag greatly slows down the transfer of oxygen from the slag to the steel. While, of course, the residual iron oxide in the steel itself will still result in some oxidation and loss of carbon, the fact that there is after treatment very little oxygen entering the metal from the slag prevents this carbon loss from being too great for accurate carbon control.

Having thus described my invention, what I claim as new and desire to secure by Letters Patent is:

1. In the manufacture of steel in the open hearth furnace involving the formation of a basic slag, the method comprising working the heat until it has reached the desired carbon concentration, deoxidizing the slag by adding to it finely divided ferro-silicon, promptly thereafter adding to the steel the desired alloying or deoxidizing elements and tapping the heat as soon as said alloying or deoxidizing elements have melted, the addition of said finely divided ferro-silicon being sufficient to substantially retard the transfer of iron oxide from the slag to the steel bath, but not sufficient to cause reversion of phosphorus from the slag to the steel bath.

2. In the manufacture of steel in the open hearth furnace involving the formation of a basic slag, the step comprising deoxidizing the slag in the furnace shortly before tapping the heat with finely divided ferro-silicon to the point of substantially retarding the transfer of iron oxide from the slag to the steel bath, but not to the point of causing the reversion of phosphorus from the slag to the steel bath.

CHARLES H. HERTY, Jr.